US007228367B2

(12) United States Patent
Kagemoto

(10) Patent No.: US 7,228,367 B2
(45) Date of Patent: Jun. 5, 2007

(54) DIRECT MEMORY ACCESS CONTROLLER FOR CARRYING OUT DATA TRANSFER BY DETERMINING WHETHER OR NOT BURST ACCESS CAN BE UTILIZED IN AN EXTERNAL BUS AND ACCESS CONTROL METHOD THEREOF

(75) Inventor: Tetsuya Kagemoto, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 425 days.

(21) Appl. No.: 10/133,742

(22) Filed: Apr. 29, 2002

(65) Prior Publication Data

US 2002/0188771 A1    Dec. 12, 2002

(30) Foreign Application Priority Data

Jun. 6, 2001 (JP) ............................. 2001-170898

(51) Int. Cl.
 *G06F 3/00* (2006.01)
(52) U.S. Cl. ..................... 710/26; 710/22; 710/27; 710/28; 709/212
(58) Field of Classification Search ............ 710/22–28, 710/33, 107; 711/147, 148, 149; 709/212
See application file for complete search history.

(56) References Cited

U.S. PATENT DOCUMENTS 5,651,138 A * 7/1997 Le et al. .................... 711/154
5,928,365 A * 7/1999 Yoshida ...................... 713/324
6,185,634 B1 * 2/2001 Wilcox ......................... 710/26
6,185,637 B1 * 2/2001 Strongin et al. ............. 710/35
6,321,310 B1 * 11/2001 McCarthy et al. .......... 711/154
6,336,154 B1 * 1/2002 McCarthy et al. ............ 710/35
6,651,134 B1 * 11/2003 Phelan ....................... 711/104
6,697,882 B1 * 2/2004 Matsui ........................ 710/6
6,728,813 B1 * 4/2004 Kondo et al. ............... 710/305

OTHER PUBLICATIONS

Tetsuya Kagemoto, et al, "*DMA Controller in Which Bus Access Ration Can Be Set*"U.S. Appl. No. 09/822,361, filed Apr. 2, 2001.

* cited by examiner

*Primary Examiner*—Kim Huynh
*Assistant Examiner*—Eron Sorrell
(74) *Attorney, Agent, or Firm*—McDermott Will & Emery LLP

(57) ABSTRACT

An address region of an internal bus wherein a burst access can be utilized in an external bus is set in an address table. A DMA control unit determines whether or not a burst access can be utilized in the external bus by comparing an address in an access to the internal bus with an address region set in the address table. Then, the DMA control unit carries out a direct memory access transfer by utilizing a burst access when it is determined that the burst access can be utilized in the external bus. Accordingly, the DMA control unit can carry out a DMA transfer by using a burst access without the intervention of a FIFO memory and it becomes possible to carry out a high speed DMA transfer.

6 Claims, 13 Drawing Sheets

FIG.6

| start_addr1[0:31] | mask_bit1[0:31] |
|---|---|
| start_addr2[0:31] | mask_bit2[0:31] |
| start_addr3[0:31] | mask_bit3[0:31] |
| start_addr4[0:31] | mask_bit4[0:31] |

FIG.10

| start_addr1[0:31] | mask_bit1[0:31] | r1 | w1 |
| --- | --- | --- | --- |
| start_addr2[0:31] | mask_bit2[0:31] | r2 | w2 |
| start_addr3[0:31] | mask_bit3[0:31] | r3 | w3 |
| start_addr4[0:31] | mask_bit4[0:31] | r4 | w4 |

FIG.12

| start_addr1[0:31] | mask_bit1[0:31] | clk1_1 | clk2_1 |
| --- | --- | --- | --- |
| start_addr2[0:31] | mask_bit2[0:31] | clk1_2 | clk2_2 |
| start_addr3[0:31] | mask_bit3[0:31] | clk1_3 | clk2_3 |
| start_addr4[0:31] | mask_bit4[0:31] | clk1_4 | clk2_4 | ns # DIRECT MEMORY ACCESS CONTROLLER FOR CARRYING OUT DATA TRANSFER BY DETERMINING WHETHER OR NOT BURST ACCESS CAN BE UTILIZED IN AN EXTERNAL BUS AND ACCESS CONTROL METHOD THEREOF

BACKGROUND OF THE INVENTION

1. Field of the Invention

The present invention relates to a DMA (direct memory access) controller for directly controlling a data transfer between memories, or the like, without the process of the CPU (central processing unit) and the control method thereof, in particular, to a DMA controller for controlling a burst access in an external bus at the time of DMA transfer between an internal bus and an external bus and the control method thereof.

2. Description of the Background Art

In recent years information processing apparatuses such as personal computers have spread widely and the demand for higher processing speed and a greater number of functions has increased. A DMA which directly carries out data transfer between memories without the process of the CPU can be cited as a function which implements a higher processing speed of an information processing apparatus. In the following, a configuration and an operation of a conventional DMA controller are described.

(Configuration of Conventional DMA Controller)

FIG. 1 is a block diagram showing a schematic configuration of a conventional DMA controller. This DMA controller includes a transfer source address register 10 for storing the transfer source address of the DMA, a transfer destination address register 11 for storing the transfer destination address of the DMA, a DMA transfer counter 12 for storing the number of bytes of the data to be DMA transferred, a DMA request selection register 13 for selecting a request signal which starts up the DMA, a DMA control unit 50 for carrying out a DMA transfer by accessing an external memory, which is not shown, a DMA request detection unit 60 for detecting a DMA request from outside in accordance with the setting of DMA request selection register 13 and a FIFO (first in first out) memory 70 for temporarily storing data read out by DMA control unit 50.

Signals 100 to 104 indicated to the left of the DMA controller are signals at the time when an external bus master such as a CPU accesses transfer source address register 10, transfer destination address register 11, DMA transfer counter 12 or DMA request selection register 13 and include a chip select (CS) signal 100 for indicating that the access is valid, 32 address (ADDR [31:0]) signals 101 for selecting the registers to be accessed, a read/write control (RW) signal 102 for indicating whether the access is a read access or a write access, 32 write data (WDATA [31:0]) signals 103 for transferring data for a write access and 32 read data (RDATA [31:0]) signals 104 for transferring data for a read access.

Signals 110 to 115 indicated to the right of the DMA controller are signals for accessing buses inside of the semiconductor chip in which the DMA controller is incorporated (hereinafter referred to as internal buses) and include 32 internal address (IADDR [31:0]) signals 110 for selecting regions to be accessed, an internal read/write control (IRW) signal 111 for indicating whether the access is a read access or a write access, 32 internal write data (IWDATA [31:0]) signals 112 for transferring data for a write access, 32 internal read data (IRDATA [31:0]) signals 113 for transferring data for a read access, an internal ready (IREADY) signal 114 for indicating that the bus access has been completed and an internal bus access request (IREQ) signal 115 for requesting the internal bus to make an access.

In addition, signals 120 to 126 indicated to the right of the DMA controller are signals for carrying out an access request to an external bus interface, which is not shown, connected to a bus (hereinafter referred to as external bus) outside of the semiconductor chip in which the DMA controller is incorporated and include 32 external address (EADDR [31:0]) signals 120 for selecting regions to be accessed, an external read/write control (ERW) signal 121 for indicating whether the access is a read access or a write access, 32 external write data (EWDATA [31:0]) signals 122 for transferring data for a write access, 32 external read data (ERDATA [31:0]) signals 123 for transferring data for a read access, an external ready (EREADY) signal 124 for indicating that the bus access has been completed, an external bus access request (EREQ) signal 125 for requesting an external bus to make an access and an external burst request (EBURST) signal 126 for requesting an external bus interface to make a burst access.

In addition, a DMA request signal (DMAREQ [31:0]) 130 for accepting a DMA request and a clock (CLK) signal 150 utilized in the entire system are included as other signals.

(Operation of Conventional DMA Controller)

(1) Setting of DMA

The setting of a DMA is carried out by the CPU by writing values in the internal registers (transfer source address register 10, transfer destination address register 11, DMA transfer counter 12 and DMA request selection register 13) of the DMA controller.

FIG. 2 is a timing chart when the CPU writes a value in the internal register of the DMA controller. The internal register receives a value of ADDR [31:0] 101 at the rising edge of CLK signal 150 in cycle 1 in the case where it is detected that CS signal 100 is at a high level (hereinafter merely denoted as "H") and that RW signal 102 is at a low level hereinafter merely denoted as "L"). The decode result of this ADDR [31:0] 101 determines which register is accessed. Then, the value of WDATA [31:0] 112 is written into the register that is selected by the address which is received.

A transfer source address of the DMA is set in transfer source address register 10, a transfer destination address of the DMA is set in transfer destination address register 11 and the byte number of the data to be transferred by the DMA is set in DMA transfer counter 12. In addition, each bit of DMA request selection register 13 corresponds to, respectively, 32 signals included in DMAREQ [31:0] 130 and "1" is set at the bit corresponding to a signal which starts up the DMA.

(2) Start-Up of DMA

DMA request detection unit 60 starts a DMA transfer at the rising edge of a signal, from among signals included in DMAREQ [31:0] 130, which corresponds to the bit set to "1" in DMA request selection register 13. When DMA request detection unit 60 detects the rising edge, DMA control unit 50 is notified of this.

(3) Carrying Out of DMA

When a DMA request is detected by DMA request detection unit 60, DMA control unit 50 carries out a DMA transfer. FIG. 3 is an example of a timing chart of a conventional DMA controller at the time of DMA transfer. Here, transfer source address register 10 is set to "0x00000000," transfer destination address register 11 is set to "0x80000000" and DMA transfer counter 12 is set to "0xC."

Addresses "0x00000000" to "0x7FFFFFFF" are fixed as addresses of an internal bus while addresses "0x80000000" to "0xFFFFFFFF" are fixed as addresses of an external bus. DMA control unit 50 determines whether a transfer source address and a transfer destination address are in an internal bus or in an external bus, respectively, according to the most significant bit of the addresses stored in transfer source address register 10 and transfer destination address register 20.

In cycle 1, DMA control unit 50 asserts IREQ signal 115 of the internal bus and outputs the first transfer source address to IADDR [31:0] 110 so as to start a read access to the internal bus. At this time, DMA control unit 50 outputs a "H" to IRW signal 111 and gives notification of the read access.

In cycle 2, IREADY signal 114 of the internal bus becomes of "H" and notification is made that the internal bus access is completed. At the end of this cycle, DMA control unit 50 writes the value of IRDATA [31:0] 113 in FIFO memory 70.

In cycle 3, second read access is started with the internal bus, EREQ signal 125 is asserted to an external bus interface, the first transfer destination address is outputted to EADDR [31:0] 120, the data read out from FIFO memory 70 is outputted to EWDATA [31:0] 122 and a write access to the external bus interface is started. At this time, DMA control unit 50 outputs a "L" to ERW signal 121 and makes notification that the access is a write access. In this cycle 3, a "H" is outputted to EREADY signal 124 by the external bus interface so that notification is made that the external bus access is completed.

In the following, in the same manner as in the above, in cycle 4, the second read access to the internal bus is completed and the data from the internal bus is written into FIFO memory 70. In cycle 5, the third read access to the internal bus is started and the second write access to the external bus interface is carried out. In cycle 6, the third-time read access to the internal bus is completed and data from the internal bus is written into FIFO memory 70. In cycle 7, the third write access to the external bus interface is carried out so as to complete the DMA transfer.

FIG. 4 shows another example of a timing chart of a conventional DMA controller at the time of DMA transfer. In this timing chart, the write access to the external bus interface is carried out in a burst access mode. Here, "0x00000000" is set in transfer source address register 10, "0x80000000" is set in transfer destination address register 11 and "0x10" is set in DMA transfer counter 12. DMA control unit 50 determines whether a transfer source address and a transfer destination address are in an internal bus or in an external bus, respectively, according to the most significant bit of the addresses stored in transfer source address register 10 and transfer destination address register 11.

In cycle 2, DMA control unit 50 asserts IREQ signal 115 of the internal bus and outputs the first transfer source address to IADDR [31:0] 110 so as to start a read access to the internal bus. At this time, DMA control unit 50 outputs a "H" to IRW signal 111 and gives notification that the access is a read access. In this cycle, IREADY signal 114 of the internal bus becomes of "H" and notification is made that the internal bus access is completed. At the end of this cycle, DMA control unit 50 writes the value of IRDATA [31:0] 113 into FIFO memory 70.

In cycle 3, IADDR [31:0] 110 is updated and second read access to the internal bus is started. Similar operations are carried out in cycles 4 and 5 and four read accesses to the internal bus are carried out so that respective data is written into FIFO memory 70. At the end of cycle 5, IREQ signal 115 is negated and the read access to the internal bus is completed.

In cycle 6, DMA control unit 50 asserts EREQ signal 125 and EBURST signal 126 of the external bus and outputs the first transfer destination address to EADDR [31:0] 120 so that a write access to the external bus interface is started. At this time, DMA control unit 50 outputs a "L" to ERW signal 121 and makes a notification that this access is a write access. DMA control unit 50 reads out data stored in FIFO memory 70 and outputs the data to EWDATA [31:0] 122. In this cycle, EREADY signal 124 of the external bus becomes of "H" and notification is made that the external bus access is completed.

In cycle 7, EADDR [31:0] 120 is updated and second write access to the external bus is started. Similar operations are carried out in cycles 8 and 9 and the four write accesses to the external bus are carried out so that respective data stored in FIFO memory 70 is outputted to the external bus interface. At the end of cycle 9, EREQ signal 125 and EBURST signal 126 are negated and the write access to the external bus is completed.

However, in the case that a DMA transfer from the internal bus to the external bus is carried out by using the above described conventional DMA controller, FIFO memory 70 becomes indispensable when the burst access to the external bus is faster than the access to the internal bus. That is to say, when a DMA transfer from the internal bus to the external bus is attempted to be carried out without using FIFO memory 70, the speed of the read access to the internal bus cannot keep up with the speed of the burst access to the external bus so that failure of reading data occurs and correct data transfer cannot be carried out.

In addition, in the case that a DMA transfer from the external bus to the internal bus is carried out by using the above described conventional DMA controller, when the burst access to the external bus is faster than the access to the internal bus and when a DMA transfer from the external bus to the internal bus without using FIFO memory 70 is attempted to be carried out, the speed of the write access to the internal bus cannot keep up with the speed of the burst access to the external bus so that an overflow occurs and correct data transfer cannot be carried out.

In addition, in the conventional DMA controller the cycle number required for one access to the internal bus cannot be predicted and, therefore, in the case that a burst access is requested for the external bus interface, it is necessary to carry out a data transfer by using FIFO memory 70 regardless of the actual cycle number required for the access to the internal bus.

Furthermore, in the case that the amount of data to be transfer red by using FIFO memory 70, in particular the maximum amount of data to be transferred that is allowed in the DMA transfer, exceeds the capacity of FIFO memory 70, the control of the DMA transfer becomes complicated due to reasons such that it is necessary to carry out one DMA transfer request by dividing into a plurality of DMA transfers.

Because of the above reasons, there is a problem that an expensive FIFO memory 70 must be mounted in the DMA controller and the cost for the DMA controller becomes high.

SUMMARY OF THE INVENTION

A purpose of the present invention is to provide a DMA controller and a control method thereof which allow the carrying out of a high speed DMA transfer by using a burst mode without the mounting of a FIFO memory.

Another purpose of the present invention is to provide a DMA controller and a control method thereof which allow cost reduction.

A direct memory access controller according to an aspect of the present invention is a direct memory access controller for carrying out a data transfer between an internal bus and an external bus including a determination unit determining whether or not a burst access can be utilized in the external bus based on the address of the access to the internal bus and a control unit carrying out a direct memory access transfer by utilizing a burst access when the determination unit determines that the burst access can be utilized in the external bus.

Since the determination unit determines whether or not the burst access can be utilized in the external bus based on the address of the access to the internal bus, the control unit can carry out a DMA transfer by using the burst access without the intervention of a FIFO memory so that it becomes possible to carry out a high speed DMA transfer. In addition, since it becomes unnecessary to mount a FIFO memory, it becomes possible to reduce the cost of the DMA controller.

A direct memory access control method according to another aspect of the present invention is a direct memory access control method for carrying out a data transfer between an internal bus and an external bus including the step of determining whether or not a burst access can be utilized in the external bus based on the address of the access to the internal bus and the step of carrying out a direct memory access transfer by utilizing the burst access in the case that the burst access can be utilized in the external bus.

Since it is determined whether or not the burst access can be utilized in the external bus based on the address of the access to the internal bus, a DMA transfer can be carried out by using the burst access without the intervention of a FIFO memory so that it becomes possible to carry out a high speed DMA transfer. In addition, since it becomes unnecessary to mount a FIFO memory, it becomes possible to reduce the cost for the DMA controller.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram for describing the configuration of an address table 80;

FIG. 10 is a diagram for describing the configuration of an address table 81;

FIG. 12 is a diagram for describing the configuration of an address table 82.

DESCRIPTION OF THE PREFERRED EMBODIMENTS

[First Embodiment]

(Configuration of DMA Controller)

Figure 5:
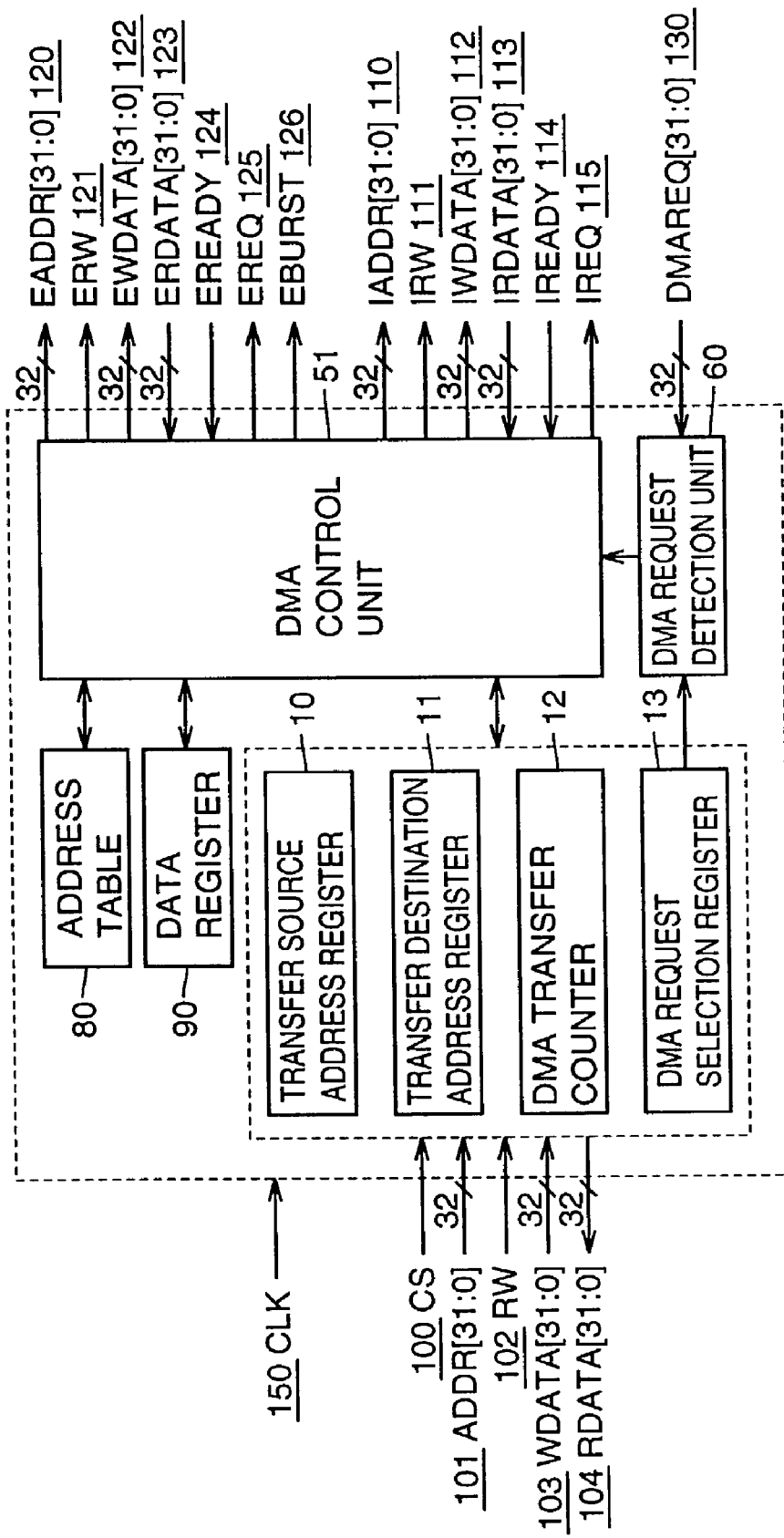
FIG. 5 is a block diagram showing the schematic configuration of a DMA controller according to a first embodiment of the present invention.

FIG. 5 is a block diagram for describing a schematic configuration of a DMA controller according to the first embodiment of the present invention. This DMA controller includes transfer source address register 10 for storing a transfer source address of the DMA, transfer destination address register 11 for storing a transfer destination address of the DMA, DMA transfer counter 12 for storing the byte number of the data to be DMA transferred, DMA request selection register 13 for selecting a request signal that starts up the DMA, a DMA control unit 51 for carrying out a DMA transfer by accessing an external memory which is not shown, DMA request detection unit 60 for detecting a DMA request from the outside in accordance with the setting of DMA request selection register 13, address table 80 for storing an address of an external bus which allows a burst access and a data register 90 having the length of 32 bits for temporarily storing data to be transferred in a DMA transfer. Here, the units to which the same reference symbols are attached as in the DMA controller described in the prior art have the same configurations and functions. In addition, the input/output signals of the DMA controller are the same as described in the prior art and the detailed description thereof is not repeated.

FIG. 6 is a diagram for describing a configuration of address table 80. This address table 80 stores 4 start addresses start_addr1 to start_addr4 and mask bits mask_bit1 to mask_bit4 which correspond to respective start addresses. The start addresses and mask bits have the length of 32 bits, respectively, and address regions of an internal bus which allow the utilization of the burst access in the external bus in a DMA transfer between the internal bus and the external bus are set in the start addresses and mask bits.

A start address of an address region of the internal bus which is desired to be set is set in the start address. A value obtained by subtracting 1 from the size of the address region of the internal bus which is desired to be set is set in the mask bit. Though in the present embodiment, the size of the address region is able to be set at a value of 2 raised to a power, the invention is not limited to this. In addition, though only addresses which can be divided by the size of the address region which is set in the mask bit are able to be set in the start address, the invention is not limited to this.

For example, in the case that an address region of the size of "0x00004000" which is represented by the addresses "0x00008000" to "0x0000bfff" is set, "0x00008000" is set in the start address and "0x00003fff" is set in the mask bit. Though in the present embodiment, up to 4 address regions of the internal bus are able to be set in address table 80, the invention is not limited to this.

(Operation of DMA Controller)

(1) Setting of DMA

Figure 1:
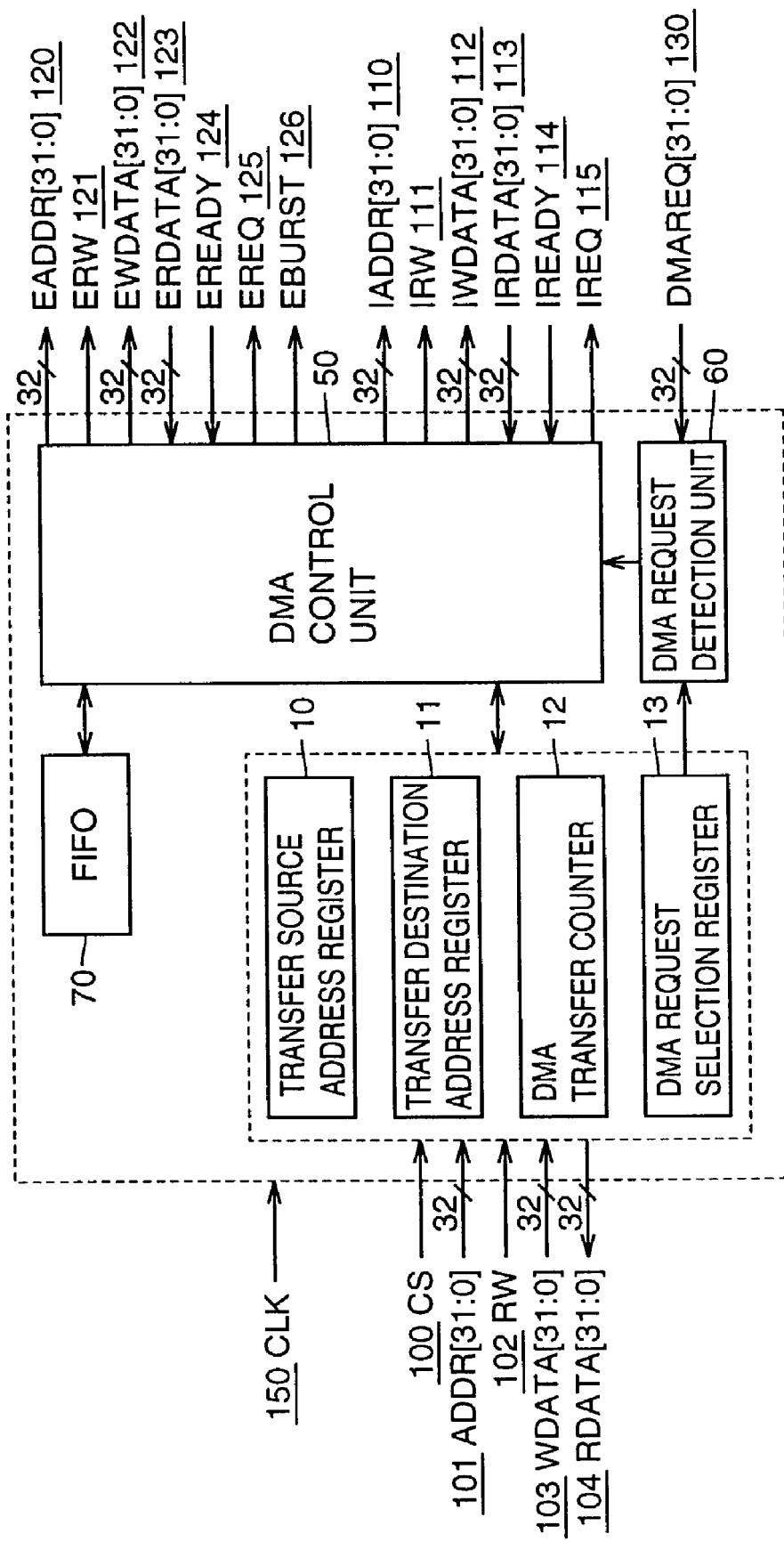
FIG. 1 is a block diagram showing a schematic configuration of a conventional DMA controller.
Figure 2:
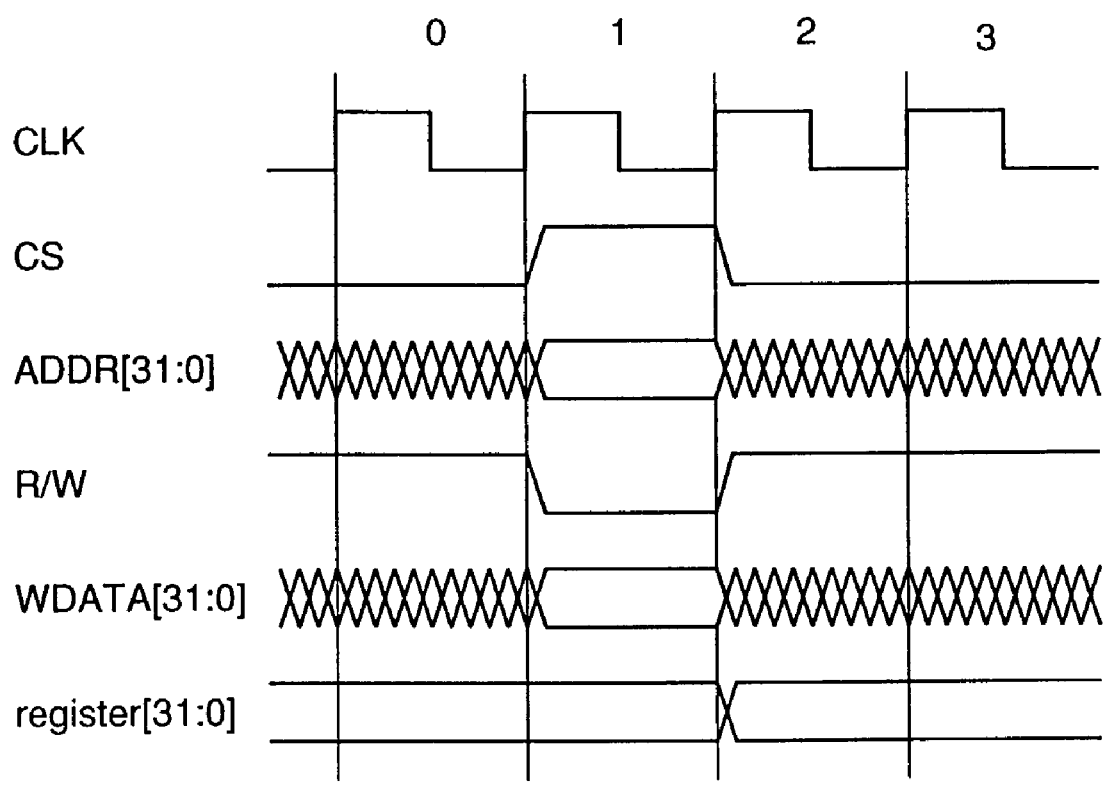
FIG. 2 is a timing chart showing that the CPU writes a value into the internal register of the DMA controller.
Figure 3:
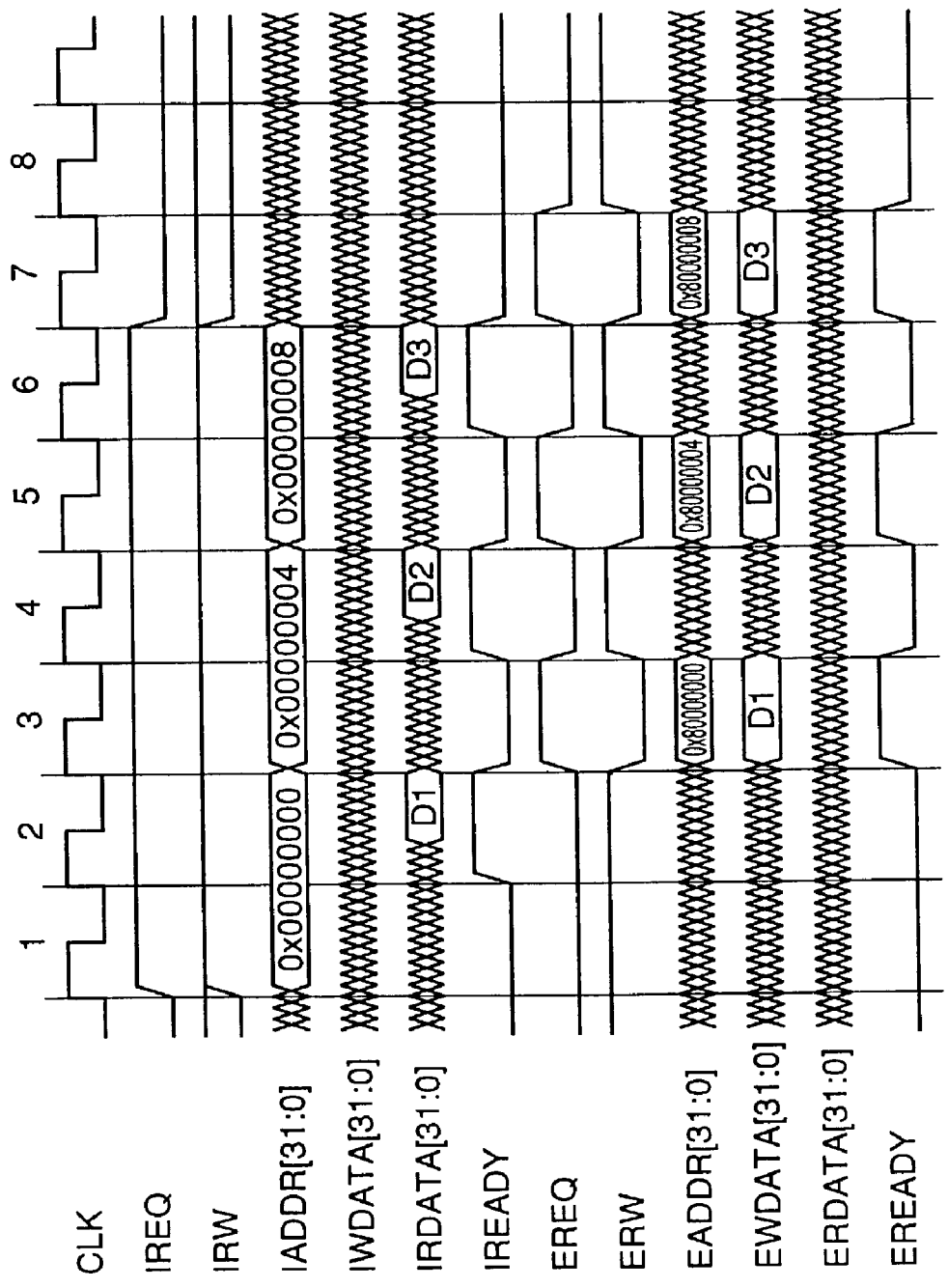
FIG. 3 is an example of a timing chart of the conventional DMA controller at the time of a DMA transfer.
Figure 4:
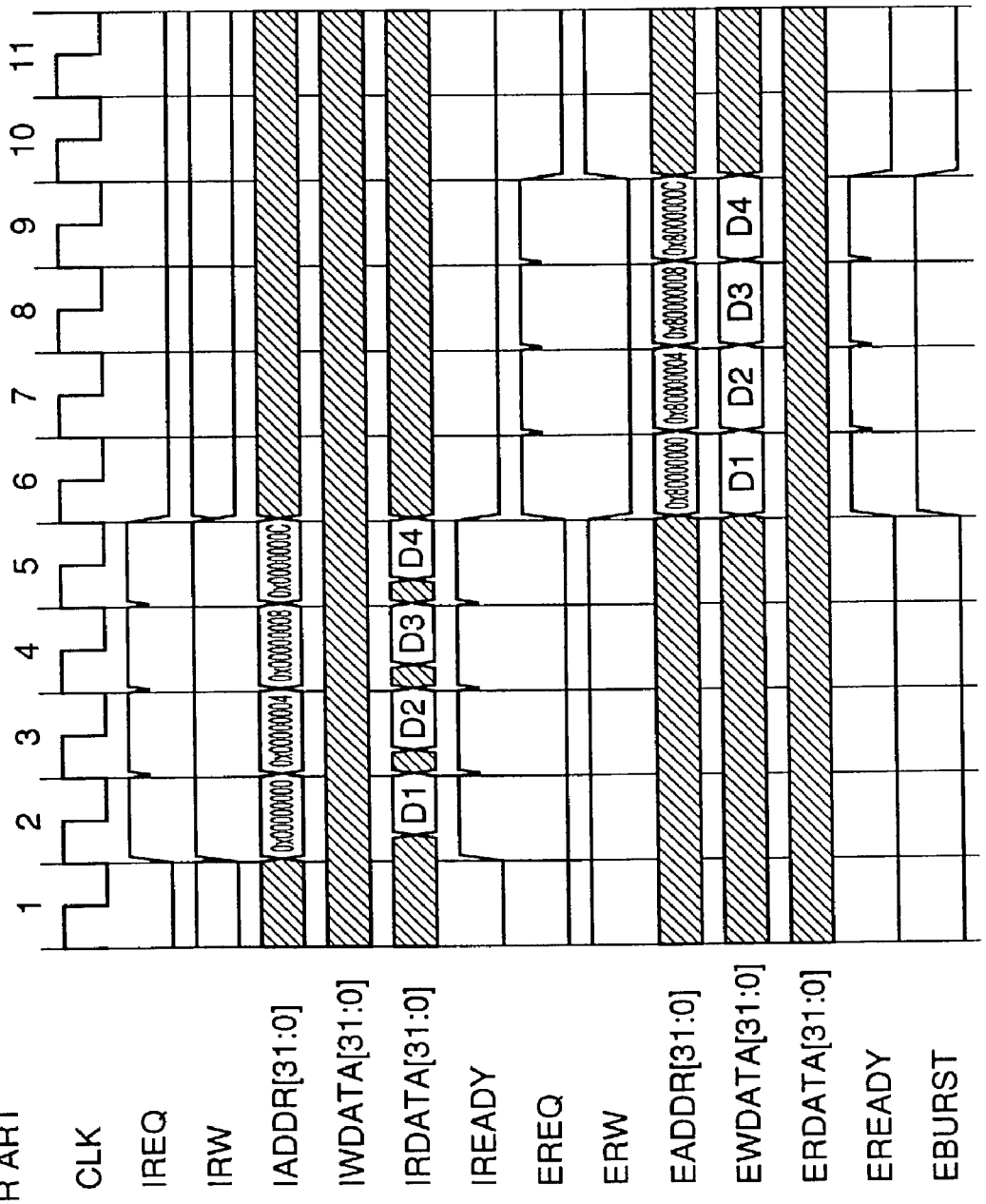
FIG. 4 is another example of a timing chart of the conventional DMA controller at the time of a DMA transfer.

The setting of the DMA is carried out by the CPU, which is not shown, by writing a value into address table 80 in addition to the writing operation into transfer source address register 10, transfer destination address register 11, DMA transfer counter 12 and DMA request selection register 13 described in the prior art. Here, the timing of writing into address table 80 is the same timing that is described in reference to FIG. 2 and a detailed description is not repeated.

(2) Start-Up of DMA

When DMA request detection unit 60 detects a rising edge of a signal corresponding to the bit set to "1" in DMA request selection register 13 from among signals included in DMAREQ [31:0] 130, a DMA transfer is started.

(3) Carrying Out of DMA

When DMA request detection unit 60 detects a rising edge of a signal corresponding to the bit set to "1" in DMA request selection register 13, DMA control unit 51 starts a DMA transfer. At the time of start-up of a DMA transfer, DMA control unit 51 refers to the most significant bit of the address values stored in transfer source address register 10 and transfer destination address register 11 so as to determine whether the transfer source address and transfer destination address are, respectively, in the internal bus or in the external bus. In the present embodiment "0x00000000" to "0x7FFFFFFF" are fixed in addresses in the internal bus while "0x80000000" to "0xFFFFFFFF" are fixed in addresses in the external bus.

In the case that the transfer source address is in the internal bus while the transfer destination address is in the external bus or in the case that the transfer source address is in the external bus while the transfer destination address is in the internal bus, DMA control unit 51 determines whether or not a burst access of the external bus is available in reference to address table 80. DMA control unit 51 determines whether or not the value of transfer source address register 10 hits any address regions set in address table 80 in the case that the transfer source address is in the internal bus while the transfer destination address is in the external bus and determines whether or not the value of transfer destination address register 11 hits any address regions set in address table 80 in the case that the transfer source address is in the external bus while the transfer destination address is in the internal bus. The following determination equation is used for the determination of whether or not a value hits an address region. Here, the object internal address for determining whether or not a value hits an address region is in_addr [31:0].

$$\begin{aligned}\text{addr\_hit} = &((\text{in\_addr} \& \sim\text{mask\_bit1}) == \text{start\_addr1}) | \\&((\text{in\_addr} \& \sim\text{mask\_bit2}) == \text{start\_addr2}) | \\&((\text{in\_addr} \& \sim\text{mask\_bit3}) == \text{start\_addr3}) | \\&((\text{in\_addr} \& \sim\text{mask\_bit4}) == \text{start\_addr4})\end{aligned} \quad (1)$$

In the case that addr_hit becomes "1" in this determination equation, DMA control unit 51 determines that the address has made a hit. Here, in the equation (1), "&" represents a logical product, "|" represents a logical sum, "~" represents one's complement and "==" represents they become "1" in the case that the left and right sides become equal.

Figure 7:
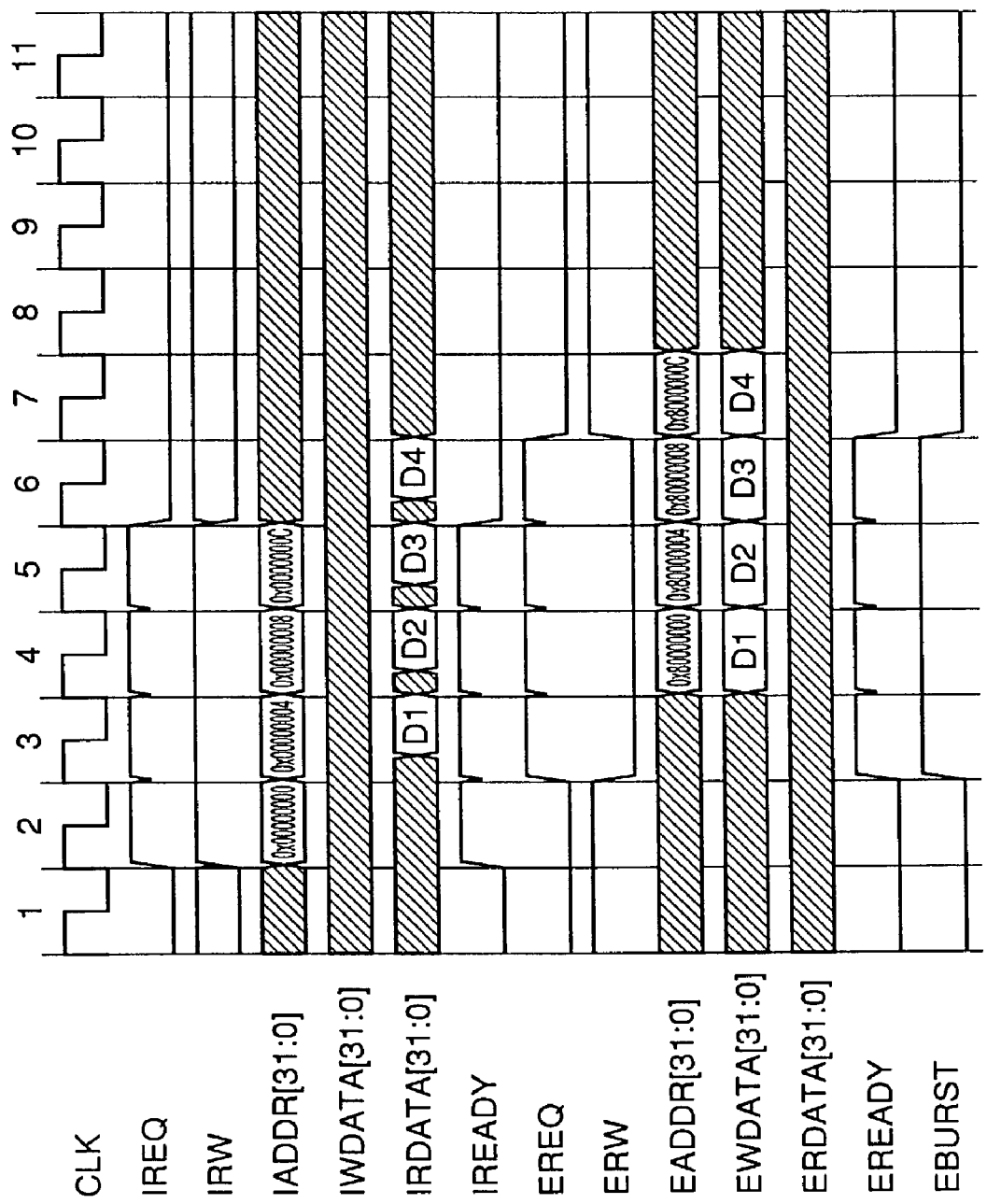
FIG. 7 is a timing chart of the DMA controller according to the first embodiment in the case that the internal address hits an address region set in address table 80.

FIG. 7 is a timing chart of the DMA controller according to the present embodiment in the case that the internal address hits the address region set in address table 80. Here, "0x00000000" is set in transfer source address register 10, "0x80000000" is set in transfer destination address register 11 and "0x10" is set in DMA transfer counter 12.

In cycle 2, DMA control unit 51 asserts IREQ signal 115 of the internal bus, outputs the first transfer source address to IADDR [31:0] 110 and starts the first read access to the internal bus. At this time, DMA control unit 51 outputs a "H" to IRW signal 111 and makes a notification of the read access. In this cycle, IREADY signal 114 becomes of "H" and notification is made that the internal bus access is completed. At the end of this cycle, DMA control unit 51 writes the value of IRDATA [31:0] 113 into data register 90.

In cycle 3, the second read access is started with the internal bus, EREQ signal 125 and EBURST signal 126 are asserted to the external bus interface, the first transfer destination address is outputted to EADDR [31:0] 120, the data read out from data register 90 is outputted to EWDATA [31:0] 122 and the first write access to the external bus interface is started. At this time, DMA control unit 51 outputs a "L" to ERW signal 121 and makes notification of a write access. In this cycle 3, IREADY signal 114 becomes of "H," notification is made that the internal bus access is completed and DMA control unit 51 writes the value of IRDATA [31:0] 113 into data register 90. In addition, a "H" is outputted to EREADY signal 124 by means of the external bus interface and notification is made that the external bus access is completed.

In the following, in the same manner as in the above, in cycle 4, the third read access to the internal bus is carried out, the data from the internal bus is written into data register 90 and the second write access to the external bus interface is carried out.

In cycle 5, the fourth read access to the internal bus is carried out, the data from the internal bus is written into data register 90 and the third write access to the external bus interface is carried out. At the end of this cycle, IREQ signal 115 is negated and the read access to the internal bus is completed.

In cycle 6, the fourth write access to the external bus interface is carried out. At the end of this cycle, EREQ signal 125 and EBURST signal 126 are negated and the DMA transfer is completed.

Figure 8:
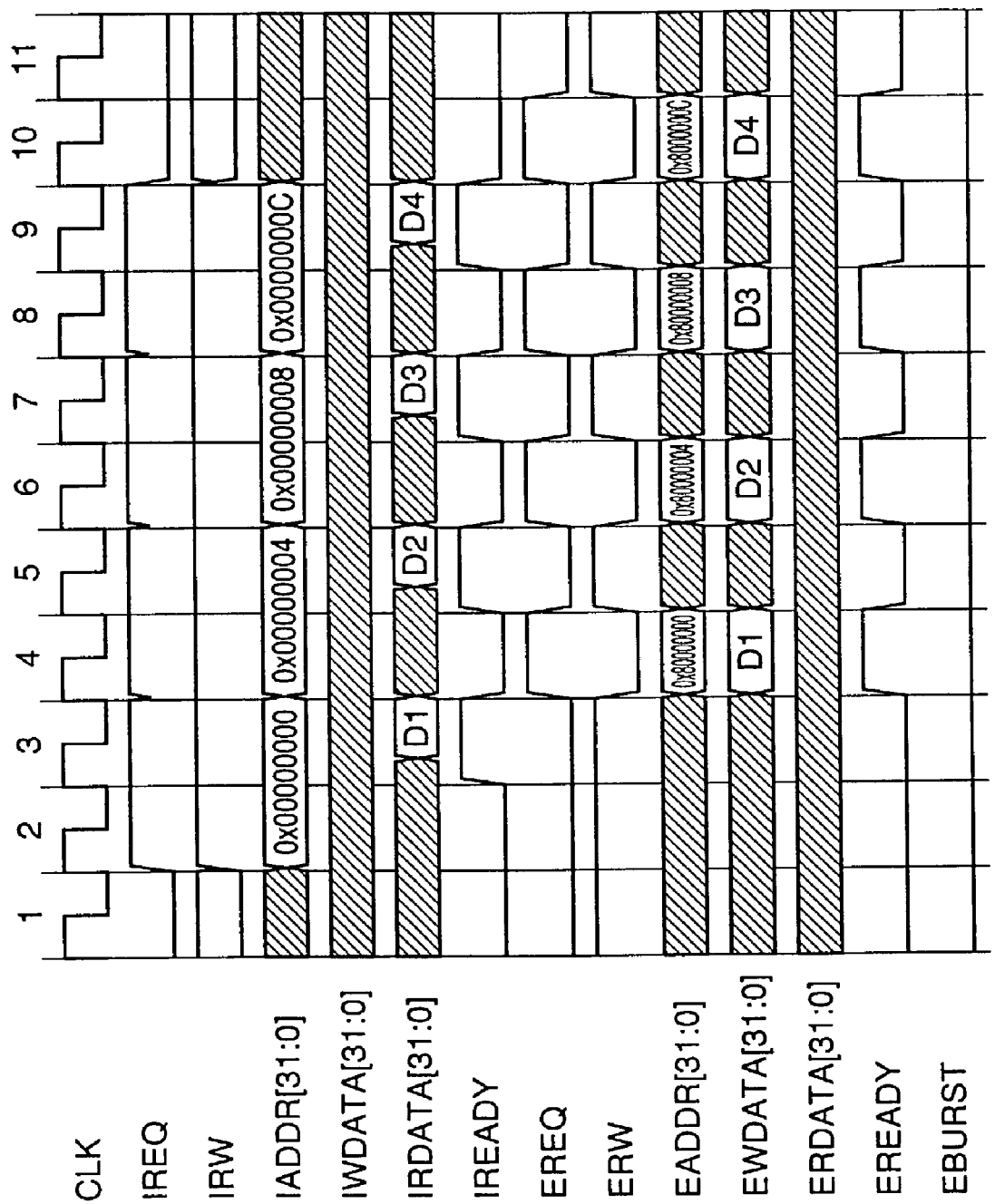
FIG. 8 is a timing chart of the DMA controller according to the first embodiment in the case that the internal address does not hit the address region set in address table 80.

FIG. 8 is a timing chart of the DMA controller according to the present embodiment in the case that the internal address has not hit the address region set in address table 80. Here, "0x00000000" is set in transfer source address register 10, "0x80000000" is set in transfer destination address register 11 and "0x10" is set in DMA transfer counter 12.

In cycle 2, DMA control unit 51 asserts IREQ signal 115 of the internal bus, outputs the first transfer destination address to IADDR [31:0] 110 and starts the first read access to the internal bus. At this time, DMA control unit 51 outputs a "H" to IRW signal 111 and makes notification of read access.

In cycle 3, IREADY signal 114 becomes of "H" and notification is made that the first internal bus access is completed. At the end of this cycle DMA control unit 51 writes the value of IRDATA [31:0] 113 into data register 90.

In cycle 4, the second read access is started with the internal bus, EREQ signal 125 is asserted to the external bus interface, the first transfer destination address is outputted to EADDR [31:0] 120, the data read out from data register 90 is outputted to EWDATA [31:0] 122 and the first write access to the external bus interface is started. At this time, DMA control unit 51 outputs a "L" to ERW signal 121 and makes notification of write access. In this cycle, a "H" is outputted to EREADY signal 124 by means of the external bus interface and notification is made that the external bus access is completed. Here, the burst access of the external bus is not available and, therefore, EBURST signal 126 is not asserted.

In cycle 5, IREADY signal 114 becomes of "H," notification is made that the second time internal bus access is completed and DMA control unit 51 writes the value of IRDATA [31:0] 113 into data register 90.

In the same manner, in cycle 6, the third time read access to the internal bus is started and the second write access to the external bus interface is carried out. In cycle 7, IREADY signal 114 becomes of "H," notification is made that the third internal bus access is completed and DMA control unit 51 writes the value of IRDATA [31:0] 113 into data register 90.

In cycle 8, the fourth read access to the internal bus is started and the third write access to the external bus interface is carried out. In cycle 9, IREADY signal 114 becomes of "H," notification is made that the fourth internal bus access is completed and DMA control unit 51 writes the value of IRDATA [31:0] 113 into data register 90.

In cycle 10, the fourth write access to the external bus interface is carried out. At the end of this cycle, EREQ signal 125 is negated and the DMA transfer is completed.

Here, though the configuration such that a DMA transfer is carried out by using data register 90 is described in the present embodiment, a data transfer may be carried out on a data bus without using data register 90 by connecting IWDATA [31:0] 112 of the internal bus and ERDATA [31:0] 123 of the external bus and by connecting IRDATA [31:0] 113 of the internal bus and EWDATA [31:0] 122 of the external bus. In this case, it becomes possible to eliminate data register 90.

As described above, in accordance with the DMA controller according to the present embodiment, in the case that an address region stored in address table 80 is hit, high speed access is carried out by utilizing a burst access of the external bus while in the case that an address region stored in address table 80 is not hit, a single access is carried out without utilizing the burst access of the external bus. Accordingly, a FIFO memory becomes unnecessary and it becomes possible to reduce the cost of the DMA controller.

[Second Embodiment]

(Configuration of DMA Controller)

Figure 9:
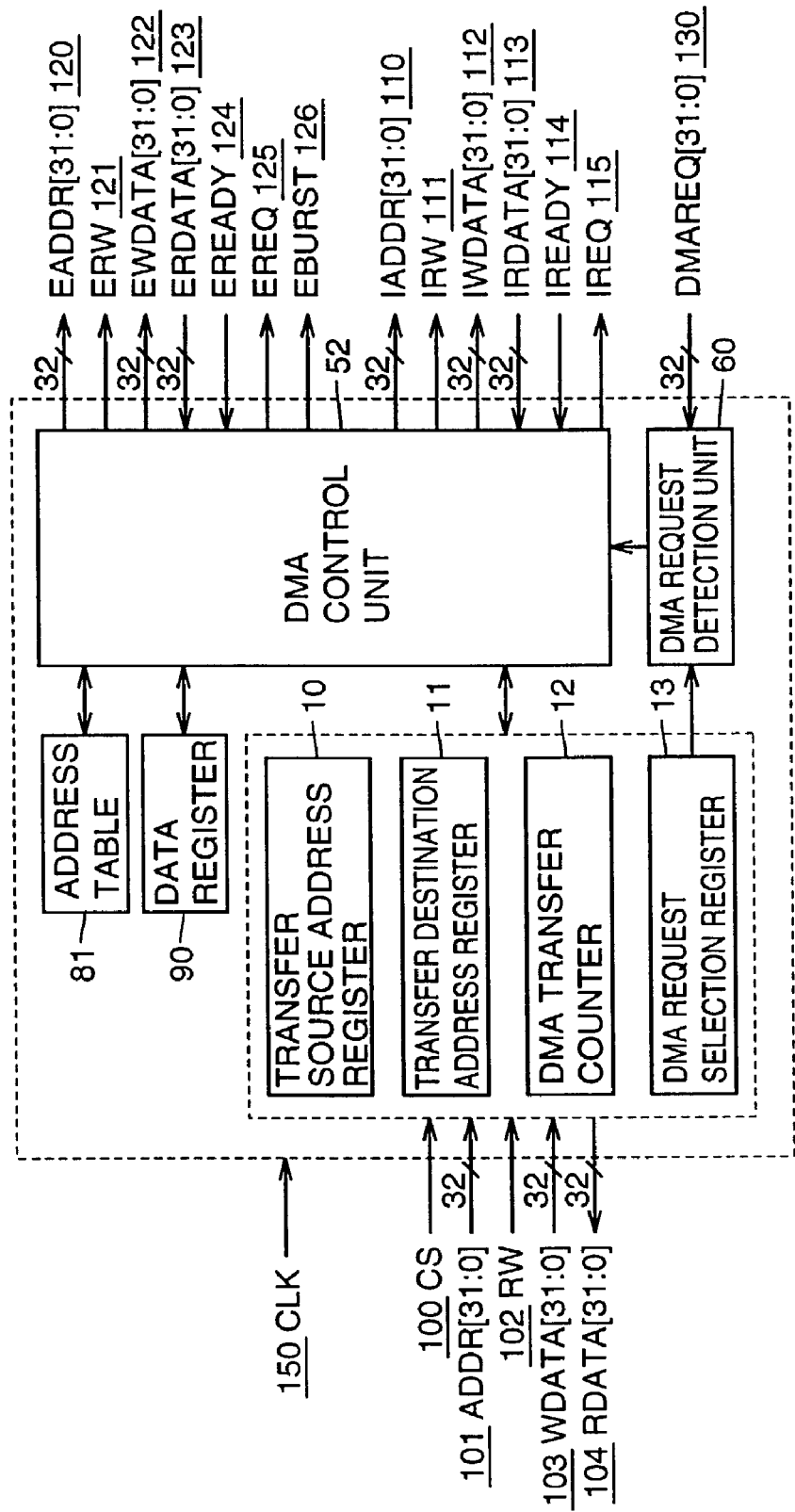
FIG. 9 is a block diagram showing the schematic configuration of a DMA controller according to a second embodiment of the present invention.

FIG. 9 is a block diagram showing a schematic configuration of a DMA controller according to the second embodiment of the present invention. This differs in comparison with the DMA controller according to the first embodiment shown in FIG. 5 only in the point that the functions of the DMA control unit and the address table are different. Accordingly, the detailed description of overlapping configurations and functions is not repeated. Here, the reference symbols of the DMA control unit and the address table in the present embodiment are referred to as 52 and 81 in the description.

FIG. 10 is a diagram for describing the configuration of address table 81. This address table 81 differs in comparison with address table 80 according to the first embodiment shown in FIG. 6 in the point that 1 bit of read bit (r1 to r4) and write bit (w1 to w4) are added to respective address regions.

In the case that the read bit is "1," it indicates that the burst access of the external bus is available in the DMA transfer from the corresponding region of the internal bus to the external bus. In addition, in the case that the write bit is "1," it indicates that the burst access of the external bus is available in the DMA transfer from the external bus to the corresponding region of the internal bus. In the case that the read bit or the write bit is "0," it indicates that the burst access of the external bus is not available.

(Operation of DMA Controller)

(1) Setting of DMA

In addition to the operations of writing to transfer source address register 10, transfer destination address register 11, DMA transfer counter 12 and DMA request selection register 13 described in the prior art, the CPU, which is not shown, writes a value into address table 81 and, thereby, the setting of the DMA is carried out. Here, the timing of the writing into address table 81 is the same as the timing described in reference to FIG. 2, of which the detailed description is not repeated.

(2) Start-Up of DMA

When DMA request detection unit 60 detects the rising edge of the signal corresponding to the bit set to "1" in DMA request selection register 13 from among signals included in DMAREQ [31:0] 130, the DMA transfer is started.

(3) Carrying Out of DMA

When DMA request detection unit 60 detects the rising edge of the signal corresponding to the bit set to "1" in DMA request selection register 13, a DMA control unit 52 starts the DMA transfer. At the time of the start of the DMA transfer, DMA control unit 52 refers to the most significant bit of the address value stored in transfer source address register 10 and transfer destination address register 11 and determines whether the transfer source address and transfer destination address are in an internal bus or in an external bus, respectively. In the present embodiment "0x00000000" to "0x7FFFFFFF" are fixed at the addresses in the internal bus while "0x80000000" to "0xFFFFFFFF" are fixed at the addresses in the external bus.

In the case that the transfer source address is in the internal bus while the transfer destination address is in the external bus, DMA control unit 52 determines, in reference to address table 81, whether or not the burst access of the external bus is available. The following determination equation is used for determining whether or not a hit is made. Here, the value set in transfer source address register 102 is src_addr [31:0].

$$\begin{aligned}addr\_hit = &(((src\_addr\&\sim mask\_bit1) == start\_addr1)\\&\&r1)|(((src\_addr\&\sim mask\_bit2) == start\_addr2)\\&\&r2)|(((src\_addr\&\sim mask\_bit3) == start\_addr3)\\&\&r3)|(((src\_addr\&\sim mask\_bit4) == start\_addr4)\\&\&r4)\end{aligned} \quad (2)$$

In this determination equation, in the case that addr_hit becomes "1," DMA control unit 52 determines that a burst access request is possible for the external bus interface.

In the case that the transfer source address is in the external bus while the transfer destination address is in the internal bus, DMA control unit 52 determines whether or not the burst access of the external bus is available in reference to address table 81. The following determination equation is used for determining whether or not a hit is made. Here, the value set in transfer destination address register 11 is dst_addr [31:0].

$$\begin{aligned}
\text{addr\_hit} = &(((\text{dst\_addr}\&\sim\text{mask\_bit1}) == \text{start\_addr1}) \\
&\&\text{w1})|(((\text{dst\_addr}\&\sim\text{mask\_bit2}) == \text{start\_addr2}) \\
&\&\text{w2})|(((\text{dst\_addr}\&\sim\text{mask\_bit3}) == \text{start\_addr3}) \\
&\&\text{w3})|(((\text{dst\_addr}\&\sim\text{mask\_bit4}) == \text{start\_addr4}) \\
&\&\text{w4}) \quad (2)
\end{aligned}$$

In this determination equation, in the case that addr_hit becomes "1," DMA control unit 52 determines that a burst access request is possible for the external bus interface.

The operation of the DMA controller in the present embodiment, in the case that DMA control unit 52 determines that the burst access request for the external bus interface is possible, is the same as is described in reference to the timing chart shown in FIG. 7. Accordingly, a detailed description is not repeated.

The operation of the DMA controller in the present embodiment, in the case that DMA control unit 52 determines that the burst access request for the external bus interface is impossible, is the same as is described in reference to the timing chart shown in FIG. 8. Accordingly, a detailed description is not repeated.

As described above, since, in accordance with the DMA controller according to the present embodiment, the read bit or the write bit is referred to at the time when DMA control unit 52 determines whether or not the address region stored in address table 81 is hit, the determination of whether or not the burst access of the external bus is available can be carried out in detail in the case that the access cycle numbers are different between the read cycle and the write cycle in the internal bus. Accordingly, it becomes possible to carry out a DMA transfer at a higher speed in comparison with the DMA controller of the first embodiment.

[Third Embodiment]

(Configuration of DMA Controller)

Figure 11:
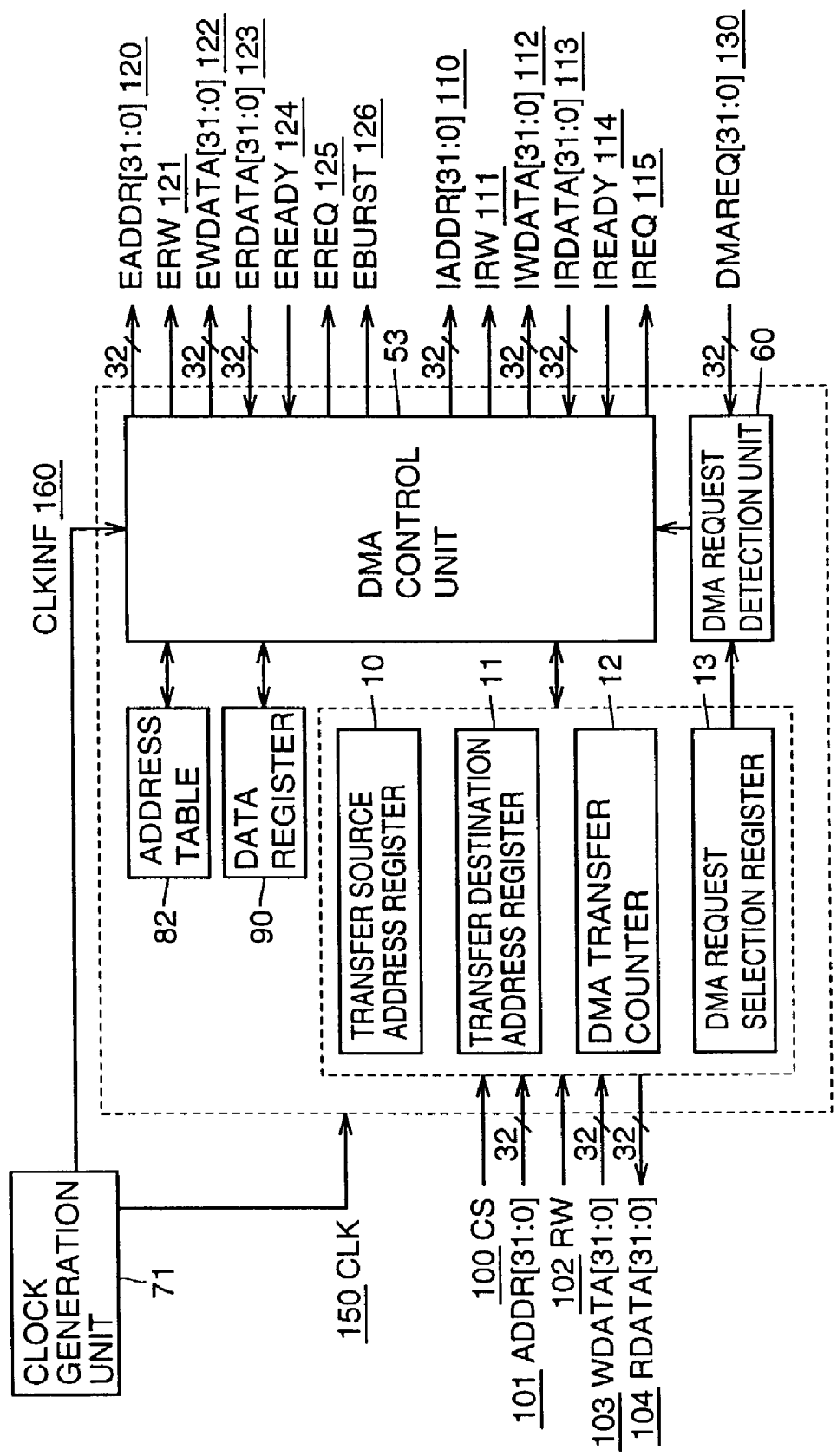
FIG. 11 is a block diagram showing the schematic configuration of a DMA controller according to a third embodiment of the present invention.

FIG. 11 is a block diagram showing a schematic configuration of a DMA controller according to the third embodiment of the present invention. This differs in comparison with the DMA controller according to the first embodiment shown in FIG. 5 only in the point that the functions of the DMA control unit and the address table are different. Accordingly, the detailed description of overlapping configurations and functions is not repeated. Here, the reference symbols of the DMA control unit and the address table in the present embodiment are referred to as 53 and 82 in the description.

A clock generation unit 71 is controlled by a CPU, or the like, which is not shown, and generates a clock signal utilized in the internal bus and a clock signal utilized in the external bus. This clock generation unit 71 outputs a clock information (CLKINF) signal 160 which indicates the clock frequency ratio of the external bus to the internal bus to the DMA controller. In the case that this CLKINF signal is "0," it indicates that the ratio of the clock frequency of the external bus to the clock frequency of the internal bus is 1:1. In addition, in the case that the CLKINF signal is "1," it indicates that the ratio of the clock frequency of the external bus to the clock frequency of the internal bus is 1:2.

FIG. 12 is a diagram describing the configuration of address table 82. This address table 82 differs in comparison with address table 80 according to the first embodiment shown in FIG. 6 only in the point that 1 bit of a clock bit 1 (clk1_1 to clk1_4) and 1 bit of a clock bit 2 (clk2_1 to clk2_4) are added to the respective address regions.

In the case that clock bit 1 is "1," if the ratio of the clock frequency of the external bus to the clock frequency of the internal bus is 1:1, it indicates that the burst access of the external bus is available in the DMA transfer between the corresponding region of the internal bus and external bus. In addition, in the case that clock bit 2 is "1," if the ratio of the clock frequency of the external bus to the clock frequency of the internal bus is 1:2, it indicates that the burst access of the external bus is available in the DMA transfer between the corresponding region of the internal bus and external bus.

(Operation of DMA Controller)

(1) Setting of DMA

In addition to the operations of writing to transfer source address register 10, transfer destination address register 11, DMA transfer counter 12 and DMA request selection register 13 described in the prior art, the CPU, which is not shown, writes a value into address table 82 and, thereby, the setting of the DMA is carried out. Here, the timing of the writing into address table 82 is the same as the timing described in reference to FIG. 2, of which the detailed description is not repeated.

(2) Start-Up of DMA

When DMA request detection unit 60 detects the rising edge of the signal corresponding to the bit set to "1" in DMA request selection register 13 from among signals included in DMAREQ [31:0] 130, the DMA transfer is started.

(3) Carrying Out of DMA

When DMA request detection unit 60 detects the rising edge of the signal corresponding to the bit set to "1" in DMA request selection register 13, DMA control unit 53 starts the DMA transfer. At the time of the start of the DMA transfer, a DMA control unit 53 refers to the most significant bit of the address value stored in transfer source address register 10 and transfer destination address register 11 and determines whether the transfer source address and transfer destination address are in an internal bus or in an external bus, respectively. In the present embodiment "0x00000000" to "0x7FFFFFFF" are fixed at the addresses in the internal bus while "0x80000000" to "0xFFFFFFFF" are fixed at the addresses in the external bus.

In the case that the transfer source address is in the internal bus while the transfer destination address is in the external bus, or in the case that the transfer source address is in the external bus while the transfer destination address is in the internal bus, DMA control unit 53 determines, in reference to address table 82, whether or not the burst access of the external bus is available. In the case that the transfer source address is in the internal bus while the transfer destination address is in the external bus, DMA controller 53 refers to the value of transfer source address register 10 and in the case that the transfer source address is in the external bus while the transfer destination address is in the internal bus, DMA controller 53 refers to the value of transfer destination address register 11 and uses the value set in address table 82 and the value of CLKINF signal 160 so as to determine whether or not a burst access request is possible for the external bus according to the following determination equation. Here, the internal address of the determined object is in_addr [0:31].

$$\begin{aligned}
\text{addr\_hit} = &(((\text{in\_addr}\&\sim\text{mask\_bit1}) == \text{start\_addr1})\& \\
&((\sim\text{clkinf}\&\text{clk1\_1})|(\text{clkinf}\&\text{clk2\_1})))| \\
&(((\text{in\_addr}\&\sim\text{mask\_bit2}) == \text{start\_addr2})\& \\
&((\sim\text{clkinf}\&\text{clk1\_2})|(\text{clkinf}\&\text{clk2\_2})))| \\
&(((\text{in\_addr}\&\sim\text{mask\_bit3}) == \text{start\_addr3})\& \\
&((\sim\text{clkinf}\&\text{clk1\_3})|(\text{clkinf}\&\text{clk2\_3})))|
\end{aligned}$$

$$\begin{aligned}&(((\text{in\_addr}\&\sim\text{mask\_bit4})==\text{start\_addr4})\&\\&((\sim\text{clkinf}\&\text{clk1}\_4)|(\text{clkinf}\&\text{clk2}\_4)))\end{aligned} \quad (4)$$

In this determination equation, in the case that addr_hit becomes "1," DMA control unit 53 determines that the burst access request is possible for the external bus interface.

In the case that DMA control unit 53 determines that the burst access request is possible for the external bus interface, the operation of the DMA controller according to the present embodiment is the same as described in reference to the timing chart shown in FIG. 7. Accordingly, a detailed description is not repeated.

In the case that DMA control unit 53 determines that the burst access request is impossible for the external bus interface, the operation of the DMA controller according to the present embodiment is the same as described in reference to the timing chart shown in FIG. 8. Accordingly, a detailed description is not repeated.

As described above, in accordance with the DMA controller according to the present embodiment, at the time when DMA control unit 53 determines whether or not the address region stored in address table 82 is hit, clock bit 1, clock bit 2 and CLKINF signal 160 are referred to and, therefore, the determination of whether or not the burst access of the external bus is available can be carried out in accordance with the clock frequency ratio of the internal bus to the external bus. Accordingly, the FIFO memory becomes unnecessary and it becomes possible to reduce the cost for the DMA controller.

[Fourth Embodiment]

(Configuration of DMA Controller)

Figure 13:
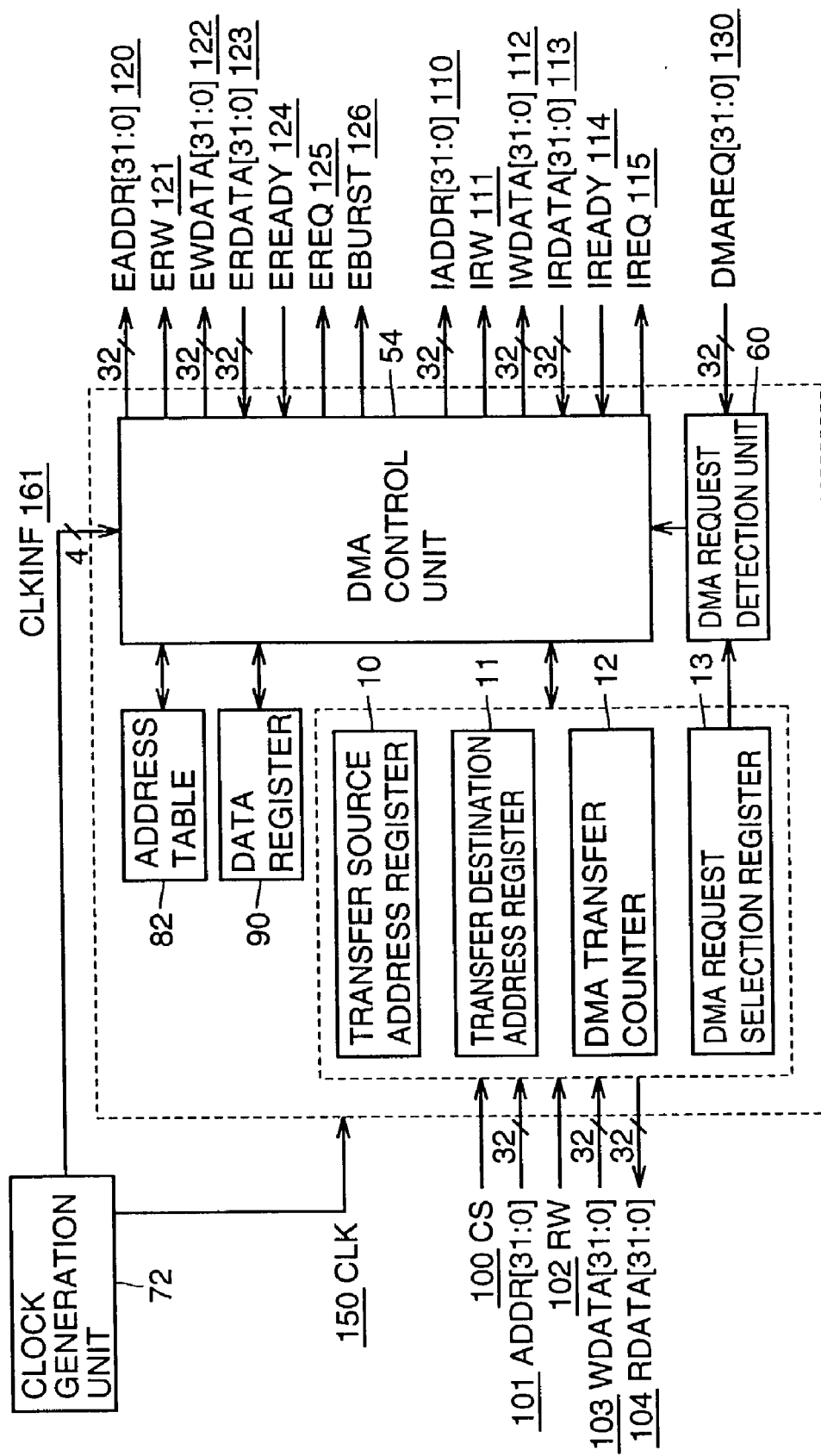
FIG. 13 is a block diagram showing the schematic configuration of a DMA controller according to a fourth embodiment of the present invention.

FIG. 13 is a block diagram showing a schematic configuration of a DMA controller according to the fourth embodiment of the present invention. This differs in comparison with the DMA controller according to the third embodiment shown in FIG. 11 only in the points that the functions of the DMA control unit are different and the CLKINF signal outputted from the clock generation unit is replaced with 4 bits. Accordingly, the detailed description of overlapping configurations and functions is not repeated. Here, the reference symbols of the DMA control unit, the clock control unit and the CLKINF signal in the present embodiment are referred to as 54, 72 and 161 in the description.

Each bit of a CLKINF signal 161 outputted from a clock generation unit 72 corresponds to each address region stored in address table 82. In the case that the bit of this CLKINF signal 161 is "0," it indicates that the ratio of the clock frequency of the external bus to the clock frequency of the internal bus is 1:1. In addition, in the case that CLKINF signal 161 is "1," it indicates that the ratio of the clock frequency of the external bus to the clock frequency in the corresponding region of the internal bus is 1:2.

The configuration of address table 82 is the same as the configuration of the address table according to the third embodiment shown in FIG. 12 and, therefore, a detailed description is not repeated.

(Operation of DMA Controller)

(1) Setting of DMA

In addition to the operations of writing to transfer source address register 10, transfer destination address register 11, DMA transfer counter 12 and DMA request selection register 13 described in the prior art, the CPU, which is not shown, writes a value into address table 82 and, thereby, the setting of the DMA is carried out. Here, the timing of the writing into address table 82 is the same as the timing described in reference to FIG. 2, of which the detailed description is not repeated.

(2) Start-Up of DMA

When DMA request detection unit 60 detects the rising edge of the signal corresponding to the bit set to "1" in DMA request selection register 13 from among signals included in DMAREQ [31:0] 130, the DMA transfer is started.

(3) Carrying Out of DMA

When DMA request detection unit 60 detects the rising edge of the signal corresponding to the bit set to "1" in DMA request selection register 13, a DMA control unit 54 starts the DMA transfer. At the time of the start of the DMA transfer, DMA control unit 54 refers to the most significant bit of the address value stored in transfer source address register 10 and transfer destination address register 11 and determines whether the transfer source address and transfer destination address are in an internal bus or in an external bus, respectively. In the present embodiment "0x00000000" to "0x7FFFFFFF" are fixed at the addresses in the internal bus while "0x80000000" to "0xFFFFFFFF" are fixed at the addresses in the external bus.

In the case that the transfer source address is in the internal bus while the transfer destination address is in the external bus, or in the case that the transfer source address is in the external bus while the transfer destination address is in the internal bus, DMA control unit 54 determines, in reference to address table 82, whether or not the burst access of the external bus is available. In the case that the transfer source address is in the internal bus while the transfer destination address is in the external bus, DMA controller 54 refers to the value of transfer source address register 10 and in the case that the transfer source address is in the external bus while the transfer destination address is in the internal bus, DMA controller 54 refers to the value of transfer destination address register 11 and uses the value set in address table 82 and the value of CLKINF signal 161 so as to determine whether or not a burst access request is possible for the external bus according to the following determination equation. Here, the internal address of the determined object is in_addr [0:31].

$$\begin{aligned}\text{addr\_hit}=&(((\text{in\_addr}\&\sim\text{mask\_bit1})==\text{start\_addr1})\&\\&((\sim\text{clkinf}[1]\&\text{clk1}\_1)|(\text{clkinf}[1]\&\text{clk2}\_1))|\\&(((\text{in\_addr}\&\sim\text{mask\_bit2})==\text{start\_addr2})\&\\&((\sim\text{clkinf}[2]\&\text{clk1}\_2)|(\text{clkinf}[2]\&\text{clk2}\_2)))|\\&(((\text{in\_addr}\&\sim\\&\text{mask\_bit3})==\text{start\_addr3})\&((\sim\text{clkinf}[3]\&\text{clk1}\_3)|\\&(\text{clkinf}[3]\&\text{clk2}\_3)))|(((\text{in\_addr}\&\sim\text{mask\_bit4})\\&==\text{start\_addr4})\&((\sim\text{clkinf}[4]\&\text{clk1}\_4)|(\text{clkinf}[4]\\&\&\text{clk2}\_4)))\end{aligned} \quad (5)$$

In this determination equation, in the case that addr_hit becomes "1," DMA control unit 54 determines that the burst access request is possible for the external bus interface.

In the case that DMA control unit 54 determines that the burst access request is possible for the external bus interface, the operation of the DMA controller according to the present embodiment is the same as described in reference to the timing chart shown in FIG. 7. Accordingly, a detailed description is not repeated.

In the case that DMA control unit 54 determines that the burst access request is impossible for the external bus interface, the operation of the DMA controller according to the present embodiment is the same as described in reference to the timing chart shown in FIG. 8. Accordingly, a detailed description is not repeated.

As described above, in accordance with the DMA controller according to the present embodiment, at the time when DMA control unit 54 determines whether or not the address region stored in address table 82 is hit, clock bit 1, clock bit 2 and CLKINF signal 161 are referred to and, therefore, the determination of whether or not the burst access of the external bus is available can be carried out in accordance with the clock frequency ratio of the internal bus to the external bus in such a case that the clock frequency differs depending on the address region of the internal bus. Accordingly, it becomes possible to carry out a DMA transfer at a higher speed in comparison with the DMA controller according to the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A direct memory access controller for carrying out a direct memory access transfer between an internal bus and an external bus, comprising:
    a determination unit determining whether or not a burst access can be utilized in a first device connected to the external bus based on an address in an access to a second device connected to the internal bus; and
    a control unit carrying out the direct memory access transfer by utilizing said burst access when said determination unit determines that the burst access can be utilized in the first device connected to the external bus, wherein
    said determination unit includes:
    an address table where an address region in the internal bus in which a burst access is available in the external bus is set in accordance with a direction of a data transfer; and
    an access determination unit determining whether or not a burst access can be utilized in the external bus by comparing an address in an access to the internal bus and the address region set in said address table and by comparing an actual data transfer direction and the data transfer direction set in said address table.

2. The direct memory access controller according to claim 1, wherein a start address of the address region in the internal bus, a size of the address region in the internal bus, information showing whether or not a burst access can be utilized in the external bus at the time of a data transfer from an address region in the internal bus to the external bus, and information showing whether or not a burst access can be utilized in the external bus at the time of a data transfer from the external bus to an address region in the internal bus are set in said address table.

3. A direct memory access controller for carrying out a direct memory access transfer between an internal bus and an external bus, comprising:
    a determination unit determining whether or not a burst access can be utilized in a first device connected to the external bus based on an address in an access to a second device connected to the internal bus; and
    a control unit carrying out the direct memory access transfer by utilizing said burst access when said determination unit determines that the burst access can be utilized in the first device connected to the external bus, wherein
    said determination unit includes:
    an address table where an address region in the internal bus in which a burst access can be utilized in the external bus is set in accordance with a ratio of a clock frequency of the external bus to a clock frequency of the internal bus; and
    an access determination unit determining whether or not a burst access can be utilized in the external bus by comparing an address in an access to the internal bus and the address region set in said address table and by comparing an actual ratio of a clock frequency of the external bus to a clock frequency of the internal bus with the ratio set in said address table.

4. The direct memory access controller according to claim 3, wherein a start address of the address region in the internal bus, a size of the address region in the internal bus and a ratio of the clock frequency of the external bus to the clock frequency of the internal bus are set in said address table.

5. A direct memory access controller for carrying out a direct memory access transfer between an internal bus and an external bus, comprising:
    a determination unit determining whether or not a burst access can be utilized in a first device connected to the external bus based on an address in an access to a second device connected to the internal bus; and
    a control unit carrying out the direct memory access transfer by utilizing said burst access when said determination unit determines that the burst access can be utilized in the first device connected to the external bus, wherein a clock having different frequency is used for each address region in a circuit connected to said internal bus, and wherein said determination unit includes:
    an address table where an address region in the internal bus in which a burst access can be utilized in the external bus is set in accordance with a ratio of a clock frequency of the external bus to a clock frequency of the internal bus; and
    an access determination unit determining whether or not a burst access can be utilized in the external bus by comparing an address in an access to the internal bus and the address region set in said address table and by comparing an actual ratio of a clock frequency of the external bus, which is set for each address region in the internal bus, to a clock frequency of the internal bus with the ratio set in said address table.

6. The direct memory access controller according to claim 5, wherein a start address of the address region in the internal bus, a size of the address region in the internal bus and a ratio of the clock frequency of the external bus to the clock frequency of the internal bus are set in said address table.

* * * * *